(12) United States Patent
Matsuoka et al.

(10) Patent No.: US 8,729,154 B2
(45) Date of Patent: May 20, 2014

(54) BINDER FOR INKJET PRINTING INK, INKJET PRINTING INK CONTAINING THE BINDER, AND PRINTED PRODUCT

(75) Inventors: Ryuichi Matsuoka, Osaka (JP); Sadamu Nagahama, Osaka (JP); Mitsuru Kitada, Osaka (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 13/579,711

(22) PCT Filed: Aug. 29, 2011

(86) PCT No.: PCT/JP2011/069412
§ 371 (c)(1),
(2), (4) Date: Aug. 17, 2012

(87) PCT Pub. No.: WO2012/073562
PCT Pub. Date: Jun. 7, 2012

(65) Prior Publication Data
US 2013/0266776 A1    Oct. 10, 2013

(30) Foreign Application Priority Data

Nov. 30, 2010 (JP) ................................. 2010-266547

(51) Int. Cl.
| | |
|---|---|
| *B32B 27/00* | (2006.01) |
| *B32B 27/40* | (2006.01) |
| *B41J 2/01* | (2006.01) |
| *B41J 2/17* | (2006.01) |
| *B41J 2/175* | (2006.01) |
| *C08F 8/30* | (2006.01) |
| *C08F 283/04* | (2006.01) |
| *C08G 18/08* | (2006.01) |
| *C08G 18/28* | (2006.01) |
| *C08J 3/00* | (2006.01) |
| *C08K 3/20* | (2006.01) |
| *C08L 75/00* | (2006.01) |
| *C09D 5/00* | (2006.01) |
| *C09D 11/00* | (2006.01) |
| *G01D 11/00* | (2006.01) |

(52) U.S. Cl.
USPC ............. 523/160; 347/1; 347/85; 347/95; 347/100; 428/423.1; 523/161; 524/589; 524/590; 524/591; 524/839; 524/840; 524/507; 525/123; 525/455

(58) Field of Classification Search
USPC ................. 347/1, 85, 95, 100; 523/160, 161; 524/589, 590, 591, 839, 840, 507; 525/123, 455; 428/423.1
See application file for complete search history.

(56) References Cited

U.S. PATENT DOCUMENTS

| | | | | |
|---|---|---|---|---|
| 6,136,890 A | * | 10/2000 | Carlson et al. | 523/160 |
| 2009/0281240 A1 | * | 11/2009 | Li et al. | 524/590 |

FOREIGN PATENT DOCUMENTS

| | | |
|---|---|---|
| JP | 04-057869 A | 2/1992 |
| JP | 06-100653 A | 4/1994 |
| JP | 2003-064149 A | 3/2003 |
| JP | 2005-239947 A | 9/2005 |
| JP | 4984196 B1 | 5/2012 |

OTHER PUBLICATIONS

International Search Report, mailed Nov. 29, 2011, ISA/Japanese Patent Office, for PCT Application No. PCT/JP2011/069412.

* cited by examiner

*Primary Examiner* — Patrick Niland
(74) *Attorney, Agent, or Firm* — McDermott Will & Emery LLP

(57) ABSTRACT

An object to be achieved by the present invention is to provide a binder for an ink-jet printing ink, the binder being capable of forming a printed image having excellent durability such as rubfastness and alkali resistance without impairing good ejection stability, storage stability, etc. of an ink, and an ink-jet printing ink containing the binder. The present invention relates to a binder for an ink-jet printing ink, the binder containing an aqueous medium (D); and a polyurethane (C) obtained by reacting a polyol (A) containing a vinyl polymer (a1) having two hydroxyl groups at one end and at least one polyol (a2) selected from the group consisting of polyether polyols, polyester polyols, polyester ether polyols, and polycarbonate polyols with a polyisocyanate (B), the polyurethane (C) having a structure derived from the vinyl polymer (a1) in a side chain thereof and being dispersed in the aqueous medium (D), and printed matter.

12 Claims, No Drawings

BINDER FOR INKJET PRINTING INK, INKJET PRINTING INK CONTAINING THE BINDER, AND PRINTED PRODUCT

CROSS REFERENCE TO PRIOR APPLICATIONS

This application is a U.S. National Phase application under 35 U.S.C. §371 of International Application No. PCT/JP2011/069412, filed on Aug. 29, 2011 and claims benefit of priority to Japanese Patent Application No. 2010-266547, filed on Nov. 30, 2010. The International Application was published in Japanese on Jun. 7, 2012 as WO 2012/073562 A1 under PCT Article 21(2).

TECHNICAL FIELD

The present invention relates to a binder for an ink that can be used in ink-jet printing, and an inkjet printing ink containing the same.

BACKGROUND ART

Recently, in the ink-jet printing-related industry, which has been significantly growing, realization of high-performance ink-jet printers, improvement of inks, and the like have markedly advanced, and images having high glossiness and high definition, which are substantially equivalent to silver halide prints, have been able to be easily obtained even in ordinary households.

In particular, for inks, improvements for the purpose of realizing high image quality and reducing the environmental burden, for example, a transition from existing dye-based inks to pigment-based inks and a transition from solvent-based inks to water-based inks have been rapidly achieved. Recently, inks containing a water-based pigment ink as a main component have been actively developed.

Furthermore, with the realization of high-performance ink-jet printers and the like, performance at increasingly higher levels has been required for inks year by year. For example, recently, there has been a strong desire for realization of rubfastness at a level at which it is possible to prevent discoloration and degradation of a printed image due to lack of a pigment, the discoloration and degradation being caused by, for example, friction which may be caused when an external force is applied to a surface of the printed image, and durability, such as chemical resistance, at a level at which blurring and discoloration of a printed image are not caused when a cleaning agent such as a glass cleaner adheres to a surface of the printed image without impairing good ejection stability, storage stability, etc. of an ink.

A known example of such an ink having excellent rubfastness is an ink for ink-jet recording, the ink containing a pigment, an aqueous resin, and an aqueous medium, in which the aqueous resin is a polyurethane resin obtained by reacting an organic diisocyanate with a diol having a polyoxyethylene structure, and the polyurethane resin has a carboxyl group, a specific acid value, a specific number-average molecular weight, and a specific amount of the polyoxyethylene structure (refer to, for example, PTL 1).

Images obtained by printing using the above ink for ink-jet recording have a certain degree of rubfastness, and thus, for example, detachment of a pigment due to friction between sheets can be prevented.

However, with the expansion of the field of use of ink-jet printed matter, rubfastness at an even higher level has been desired. Under such circumstances, in a printed image formed using the above-described ink for ink-jet recording, discoloration, degradation, and damaging of the printed image due to detachment of a pigment or the like may be still caused when a strong external force is locally applied to the printed image, for example. In addition, for example, when an alkaline cleaning agent or the like adheres to a surface of an image obtained by printing using the above-described ink for ink-jet recording, there may occur a problem that floating and blurring are generated on the printed surface.

As described above, although an ink-jet printing ink that can form a printed image having both excellent rubfastness and excellent alkali resistance without impairing good ejection stability, storage stability, etc. of the ink has been desired from the industry, an ink-jet printing ink having these properties and a binder for an ink-jet printing ink, the binder being capable of being used in producing the ink, have not yet been found.

CITATION LIST

Patent Literature

PTL 1: Japanese Unexamined Patent Application Publication No. 2000-1639

SUMMARY OF INVENTION

Technical Problem

An object to be achieved by the present invention is to provide a binder for an ink-jet printing ink, the binder being capable of forming a printed image having excellent durability such as rubfastness and alkali resistance without impairing good ejection stability, storage stability, etc. of an ink, and an ink-jet printing ink containing the binder.

Solution to Problem

As a result of studies conducted in order to achieve the above object, the inventors of the present invention found that the object of the present invention can be achieved by a binder for an ink-jet printing ink, the binder containing an aqueous medium and a polyurethane in which a polyurethane component and a vinyl polymer component are bonded to each other and which has a structure derived from a vinyl polymer (a1) in a side chain thereof rather than a polyurethane obtained by simply mixing the polyurethane component and the vinyl polymer component.

Specifically, the present invention relates to a binder for an ink-jet printing ink, the binder containing an aqueous medium (D); and a polyurethane (C) obtained by reacting a polyol (A) containing a vinyl polymer (a1) having two hydroxyl groups at one end and at least one polyol (a2) selected from the group consisting of polyether polyols, polyester polyols, polyester ether polyols, and polycarbonate polyols with a polyisocyanate (B), the polyurethane (C) having a structure derived from the vinyl polymer (a1) in a side chain thereof and being dispersed in the aqueous medium (D), and printed matter.

Advantageous Effects of Invention

According to an ink-jet printing ink containing the binder for an ink-jet printing ink of the present invention, even if a strong external force is applied, a printed image with high definition can be maintained without causing detachment of a pigment and the like, and durability such as rubfastness that is substantially equivalent to that of a silver halide print and excellent alkali resistance can be imparted without impairing good ejection stability, storage stability, etc. of the ink. Accordingly, for example, printed matter obtained by photographic printing by ink-jet printing or by high-speed printing by ink-jet printing can be used in various situations such as for outdoor advertisement.

DESCRIPTION OF EMBODIMENTS

The present invention provides a binder for an ink-jet printing ink, the binder containing an aqueous medium (D); and a polyurethane (C) obtained by reacting a polyol (A) containing a vinyl polymer (a1) having two hydroxyl groups at one end and at least one polyol (a2) selected from the group consisting of polyether polyols, polyester polyols, polyester ether polyols, and polycarbonate polyols with a polyisocyanate (B), the polyurethane (C) having a structure derived from the vinyl polymer (a1) in a side chain thereof and being dispersed in the aqueous medium (D).

Herein, the term "binder for an ink-jet printing ink" refers to a resin used for the purpose of imparting a high functionality to an ink-jet printing ink. Accordingly, the binder for an ink-jet printing ink differs from a resin functioning as a dispersant used for the purpose of imparting water dispersibility to a pigment.

In the present invention, by using the specific binder for an ink-jet printing ink, it is possible to form a high-definition printed image having durability such as rubfastness that is substantially equivalent to that of a silver halide print and excellent alkali resistance without impairing ejection stability, storage stability, etc. of an ink.

First, a polyurethane (C) used in the present invention will be described.

The polyurethane (C) used in the present invention has a structure in which a vinyl polymer structure is grafted to a side chain of a polyurethane structure serving as a main chain. Specifically, a polyurethane obtained by reacting a polyol (A) containing a vinyl polymer (a1) having two hydroxyl groups at one end and at least one polyol (a2) selected from the group consisting of polyether polyols, polyester polyols, polyester ether polyols, and polycarbonate polyols; a polyisocyanate (B); and, as required, a chain extender is used as the polyurethane (C).

With an inkjet printing ink obtained by using, instead of the polyurethane (C), a polyurethane that does not have a vinyl polymer structure derived from the vinyl polymer (a1) in a side chain thereof, printed matter having excellent durability such as alkali resistance and water resistance may not be formed.

With an inkjet printing ink obtained by using, instead of the polyurethane (C), a polyurethane having a vinyl polymer structure in the main chain thereof, the ejection stability of the ink may be significantly decreased.

Accordingly, in order to achieve both durability such as alkali resistance and excellent ejection stability of the ink, it is important to use the polyurethane (C) having a structure derived from the vinyl polymer (a1) in a side chain thereof. From the standpoint of achieving both durability such as alkali resistance and water resistance and excellent ejection stability of the ink, it is preferable to use the polyurethane (C) containing the structure derived from the vinyl polymer (a1) in an amount of 1% to 70% by mass relative to the total amount of the polyurethane (C), and it is more preferable to use the polyurethane (C) containing the structure derived from the vinyl polymer (a1) in an amount of 5% to 50% by mass relative to the total amount of the polyurethane(C).

From the standpoint of maintaining good ejection stability of an ink, it is preferable to use the polyurethane (C) having a weight-average molecular weight in the range of 10,000 to 150,000, and it is more preferable to use the polyurethane (C) having a weight-average molecular weight in the range of 10,000 to 50,000.

Furthermore, it is preferable that the polyurethane (C) can be present in the aqueous medium (D) in a dispersed state. Examples of the method for dispersing the polyurethane (C) in the aqueous medium (D) include a method in which a surfactant is used and a method in which a polyurethane having a hydrophilic group is used as the polyurethane (C).

The hydrophilic group can be introduced into the polyurethane (C) by using, for example, a hydrophilic group-containing polyol. For example, an anionic group, a cationic group, and a nonionic group can be used. More preferably, among these, either an anionic group or a cationic group is used or an anionic group and a cationic group are used in combination. An anionic group is particularly preferably used.

Examples of the anionic group that can be used include a carboxyl group, a carboxylate group, a sulfonic acid group, and a sulfonate group. From the standpoint of imparting good water dispersion stability, among these, it is preferable to use carboxylate groups or sulfonate groups obtained by neutralizing some of or all of the carboxyl groups or the sulfonic acid groups with a basic compound or the like. As the cationic group, for example, a tertiary amino group can be used. An example of the nonionic group is a polyoxyethylene structure.

The hydrophilic group is present preferably in the range of 15 to 2.000 mmol/kg, and more preferably in the range of 15 to 1.500 mmol/kg relative to the total amount of the polyurethane (C) from the standpoint of obtaining a binder for an ink-jet printing ink having good storage stability and ejection stability.

In the present invention, the simple use of a polyurethane having a vinyl polymer structure derived from the vinyl polymer (a1) in a side chain thereof cannot provide an ink-jet printing ink that can form a printed image having excellent rubfastness and durability. It is important that the polyurethane (C) have a structure derived from at least one polyol (a2) selected from the group consisting of polyether polyols, polyester polyols, polyester ether polyols, and polycarbonate polyols in the main chain of the polyurethane (C) in addition to the vinyl polymer structure. By combining these specific structures, a binder for an ink-jet printing ink that can achieve the above object can be obtained.

Specific examples of the structure derived from the polyol (a2) include a polyether structure, a polyester structure, a polyether ester structure, and a polycarbonate structure.

With a binder for an inkjet printing ink, the binder being obtained by using, instead of the polyurethane (C), a polyurethane that does not have a structure derived from the polyol (a2), printed matter having excellent rubfastness may not be formed.

The structure derived from the polyol (a2) is preferably contained in an amount in the range of 5% to 80% by mass relative to the total amount of the polyurethane (C).

Regarding the polyol (A) used in the production of the polyurethane (C), it is important to use the vinyl polymer (a1) having two hydroxyl groups at one end for the purpose of introducing a vinyl polymer structure into a side chain of a polyurethane structure serving as a main chain, and to use at least one polyol (a2) selected from the group consisting of polyether polyols, polyester polyols, polyester ether polyols, and polycarbonate polyols for the purpose of imparting excellent rubfastness to printed matter formed.

The vinyl polymer (a1) having two hydroxyl groups at one end and used in the production of the polyurethane (C) may be a vinyl polymer obtained by, for example, polymerizing a vinyl monomer in the presence of a chain transfer agent having two hydroxyl groups. A specific example thereof is a vinyl polymer obtained by radical polymerization of a vinyl monomer (F) in the presence of a chain transfer agent (E) having two hydroxyl groups and a mercapto group etc. so that the vinyl monomer is polymerized using the mercapto group as a starting point.

Alternatively, the vinyl polymer (a1) having two hydroxyl groups at one end may be obtained by, for example, reacting a compound having a hydroxyl group and a glycidyl group with a vinyl polymer obtained by radical polymerization of a vinyl monomer in the presence of a chain transfer agent having a carboxyl group and a mercapto group so that the vinyl monomer is polymerized using the mercapto group as a starting point.

The resulting vinyl polymer (a1) has, at one end, two hydroxyl groups derived from the chain transfer agent. Thus, urethane bonds can be formed by reacting these two hydroxyl groups with isocyanate groups of a polyisocyanate (B) described below.

It is preferable to use the vinyl polymer (a1) having two hydroxyl groups at one end, the vinyl polymer (a1) having a number-average molecular weight in the range of 500 to 10,000, and it is more preferable to use the vinyl polymer (a1) having a number-average molecular weight in the range of 1,000 to 5,000 from the standpoint of facilitating the viscosity control in the reaction with the polyisocyanate (B), improving production efficiency of the binder for an ink-jet printing ink of the present invention, and improving ejection stability of an ink.

A hydrophilic group-containing vinyl polymer may be used as the vinyl polymer (a1) from the standpoint of providing a hydrophilic group to the resulting polyurethane (C) and imparting excellent storage stability to the binder for an ink-jet printing ink of the present invention.

An anionic group, a cationic group, and a nonionic group can be used as the hydrophilic group. The hydrophilic group that can be present in the vinyl polymer (a1) is preferably either an anionic group or a cationic group, or a combination of an anionic group and a cationic group. A cationic group is more preferable.

Examples of the anionic group that can be used include a carboxyl group, a carboxylate group, a sulfonic acid group, and a sulfonate group. From the standpoint of imparting good water dispersion stability, among these, it is preferable to use carboxylate groups or sulfonate groups obtained by neutralizing some of or all of the carboxyl groups or the sulfonic acid groups with a basic compound or the like. As the cationic group, for example, a tertiary amino group can be used. As the nonionic group, for example, a polyethylene oxide chain can be used.

From the standpoint of allowing a vinyl polymer structure derived from the vinyl polymer (a1) to present in a side chain of the polyurethane (C), the vinyl polymer (a1) is preferably a vinyl polymer that does not has a hydroxyl group other than the two hydroxyl groups at one end. Specifically, preferably, a hydroxyl-group containing vinyl monomer is not used as the vinyl monomer (F) that can be used in the production of the vinyl polymer (a1).

Examples of the chain transfer agent that can be used in the production of the vinyl polymer (a1) having two hydroxyl groups at one end include chain transfer agents (E) having two hydroxyl groups and a mercapto group etc. and chain transfer agents having a carboxyl group and a mercapto group. Among these, the chain transfer agents (E) having two hydroxyl groups and a mercapto group etc. are preferably used because the production can be easily performed.

Examples of the chain transfer agents (E) having two hydroxyl groups and a mercapto group etc. include 3-mercapto-1,2-propanediol (thioglycerol), 1-mercapto-1,1-methanediol, 1-mercapto-1,1-ethanediol, 2-mercapto-1,3-propanediol, 2-mercapto-2-methyl-1,3-propanediol, 2-mercapto-2-ethyl-1,3-propanediol, 1-mercapto-2,3-propanediol, 2-mercaptoethyl-2-methyl-1,3-propanediol, and 2-mercaptoethyl-2-ethyl-1,3-propanediol. Among these, 3-mercapto-1,2-propanediol is preferably used because it has a low odor, is excellent in terms of workability and safety, and is widely used.

Examples of the vinyl monomer (F) used in the production of the vinyl polymer (a1) include (meth)acrylic acid alkyl esters such as methyl (meth)acrylate, ethyl (meth)acrylate, n-butyl (meth)acrylate, i-butyl (meth)acrylate, t-butyl (meth)acrylate, 2-ethylhexyl (meth)acrylate, hexyl (meth)acrylate, cyclohexyl (meth)acrylate, octyl (meth)acrylate, nonyl (meth)acrylate, dodecyl (meth)acrylate, stearyl (meth)acrylate, isobornyl (meth)acrylate, dicyclopentanyl (meth)acrylate, phenyl (meth)acrylate, and benzyl (meth)acrylate; acid group- or acid anhydride group-containing vinyl monomers such as (meth)acrylic acid, β-carboxyethyl (meth)acrylate, 2-(meth)acryloyl propionic acid, crotonic acid, itaconic acid, maleic acid, fumaric acid, itaconic acid-half ester, maleic acid-half ester, maleic anhydride, and itaconic anhydride; (meth)acrylamide, N-monoalkyl(meth)acrylamide, N,N-dialkyl(meth)acrylamide, N-methylol(meth)acrylamide, N-isopropoxymethyl(meth)acrylamide, N-butoxymethyl (meth)acrylamide, and N-isobutoxymethyl(meth)acrylamide; 2-aziridinylethyl (meth)acrylate; N,N-dimethylaminoethyl (meth)acrylate, N,N-dimethylaminopropyl (meth)acrylate, N,N-diethylaminoethyl (meth)acrylate, N,N-dimethylaminopropyl (meth)acrylate, N,N-diethylaminopropyl (meth)acrylate, N-[2-(meth)acryloyloxyethyl]piperidine, N-[2-(meth)acryloyloxyethyl]pyrrolidine, N-[2-(meth)acryloyloxyethyl]morpholine, 4-[N,N-dimethylamino]styrene, 4-[N,N-diethylamino]styrene, and 2-vinylpyridine; N-methylaminoethyl (meth)acrylate and N-t-butylaminoethyl (meth)acrylate; nitrogen atom-containing vinyl monomers such as aminomethyl acrylate, aminoethyl acrylate, aminopropyl (meth)acrylate, amino-n-butyl (meth)acrylate, butylvinylbenzylamine, vinylphenylamine, and p-aminostyrene; nitriles of unsaturated carboxylic acids such as (meth)acrylonitrile; fluorine-containing vinyl monomers such as 2,2,2-trifluoroethyl (meth)acrylate, 2,2,3,3-pentafluoropropyl (meth)acrylate, and perfluorocyclohexyl (meth)acrylate; vinyl esters such as vinyl acetate, vinyl propionate, and vinyl versatate; vinyl ethers such as methyl vinyl ether, ethyl vinyl ether, propyl vinyl ether, and butyl vinyl ether; vinyl compounds having an aromatic ring, such as styrene, α-methylstyrene, and divinylstyrene; isoprene, chroloprene, butadiene, ethylene, tetrafluoroethylene, vinylidene fluoride, and N-vinylpyrrolidone; and polyoxyethylene group-containing vinyl polymers such as polyoxyethylene monomethyl ether (meth)acrylate and polyoxyethylene monoethyl ether (meth)acrylate.

As the vinyl monomer (F), at least one selected from the group consisting of the above (meth)acrylic acids and (meth)acrylic acid alkyl esters is preferably used because a reaction with the chain transfer agent can be easily controlled and production efficiency can be improved.

The polymerization reaction between the vinyl monomer (F) and the chain transfer agent (E) having two hydroxyl groups and a mercapto group can be performed by, for example, supplying the chain transfer agent (E) and the vinyl monomer (F) at one time or sequentially in the presence of a solvent, such as toluene or methyl ethyl ketone, whose temperature is adjusted to about 50° C. to 100° C. to cause radical polymerization. Thus, radical polymerization of the vinyl monomer (F) proceeds using the mercapto group etc. of the chain transfer agent (E) as a starting point to produce the vinyl polymer (a1) having two hydroxyl groups at one end. In producing the vinyl polymer (a1) having two hydroxyl groups at one end by the above method, an existing polymerization initiator may be used, as required.

The vinyl polymer (a1) having two hydroxyl groups at one end and obtained by the above method is preferably used in an amount in the range of 1% to 70% by mass, and more preferably in the range of 5% to 50% by mass relative to the total mass of materials used in the production of the polyurethane (C) from the standpoint of forming printed matter having excellent alkali resistance and water resistance. The term "total mass of materials used in the production of the polyurethane (C)" refers to the total mass of the polyol (A) containing the vinyl polymer (a1), the polyol (a2), and another polyol (a3) that can be used as required and the polyisocyanate (B). In the case where a chain extender is further used, the term "total mass of materials used in the production of the polyurethane (C)" refers to the total mass of the polyol (A), the polyisocyanate (B), and the chain extender. Hereinafter, the term "total mass of materials used in the production of the polyurethane (C)" refers to the same meaning.

The polyol (a2) used in the production of the polyurethane (C) is an essential component in order to obtain printed matter having excellent rubfastness. With a binder for an ink-jet printing ink, the binder being produced by using, instead of the polyurethane (C), a polyurethane having a structure derived from the vinyl polymer (a1) in a side chain thereof, the polyurethane (C) being obtained by reacting the vinyl polymer (a1) having two hydroxyl groups at one end and the polyisocyanate (B) without using the polyol (a2), printed matter having excellent rubfastness may not be formed.

At least one selected from the group consisting of polyether polyols, polyester polyols, polyester ether polyols, and polycarbonate polyols is used as the polyol (a2). From the standpoint of improving storage stability of an ink, water resistance of resulting printed matter, etc., among these, polyether polyols are preferably used.

Examples of the polyether polyols that can be used include polyether polyols obtained by addition polymerization of an alkylene oxide using, as an initiator, at least one compound having two or more active hydrogen atoms.

Examples of the initiator that can be used include ethylene glycol, diethylene glycol, triethylene glycol, propylene glycol, trimethylene glycol, 1,3-butanediol, 1,4-butanediol, 1,6-hexanediol, glycerol, trimethylol ethane, and trimethylol propane.

Examples of the alkylene oxide that can be used include ethylene oxide, propylene oxide, butylene oxide, styrene oxide, epichlorohydrin, and tetrahydrofuran.

As the polyether polyols, specifically, polyoxytetramethylene glycol, polypropylene glycol, or polyethylene glycol is preferably used from the standpoint of improving ejection stability of an ink. A polyether polyol having a number-average molecular weight of 1,000 to 3,000 is more preferably used from the standpoint of suppressing a feeling of tackiness of the printed surface and obtaining printed matter having excellent water resistance.

Examples of the polyester polyols that can be used include aliphatic polyester polyols and aromatic polyester polyols obtained by an esterification reaction between a low-molecular-weight polyol and a polycarboxylic acid, polyesters obtained by a ring-opening polymerization reaction of a cyclic ester compound such as ε-caprolactone, and copolymerized polyesters of these.

Examples of the low-molecular-weight polyol that can be used include ethylene glycol and propylene glycol.

Examples of the polycarboxylic acid that can be used include succinic acid, adipic acid, sebacic acid, dodecanedicarboxylic acid, terephthalic acid, isophthalic acid, phthalic acid, anhydrides thereof, and ester-formable derivatives thereof.

Examples of the polyester ether polyols that can be used include products obtained by a reaction between a polycarboxylic acid and a polyether polyol in which the alkylene oxide described above is added to the initiator. Compounds of the initiator and the alkylene oxide exemplified as those that can be used in the production of the polyether polyols can be used as the initiator and the alkylene oxide. Polycarboxylic acids exemplified as those that can be used in the production of the polyester polyols can be used as the polycarboxylic acid.

Examples of the polycarbonate polyol that can be used include polycarbonate polyols obtained by a reaction between a carbonic acid ester and a polyol, and polycarbonate polyols obtained by a reaction between phosgene and bisphenol A or the like.

Examples of the carbonic acid ester that can be used include methyl carbonate, dimethyl carbonate, ethyl carbonate, diethyl carbonate, cyclocarbonate, and diphenyl carbonate.

Examples of the polyol that can react with the carbonic acid ester include dihydroxy compounds having a relatively low molecular weight such as ethylene glycol, diethylene glycol, triethylene glycol, 1,2-propylene glycol, 1,3-propylene glycol, dipropylene glycol, 1,4-butanediol, 1,3-butanediol, 1,2-butanediol, 2,3-butanediol, 1,5-pentanediol, 1,5-hexanediol, 2,5-hexanediol, 1,6-hexanediol, 1,7-heptanediol, 1,8-octanediol, 1,9-nonanediol, 1,10-decanediol, 1,11-undecanediol, 1,12-dodecanediol, 3-methyl-1,5-pentanediol, 2-ethyl-1,3-hexanediol, 2-methyl-1,3-propanediol, 2-methyl-1,8-octanediol, 2-butyl-2-ethylpropanediol, 2-methyl-1,8-octanediol, 1,4-cyclohexanediol, 1,4-cyclohexanedimethanol, hydroquinone, resorcin, bisphenol A, bisphenol F, and 4,4'-biphenol; polyether polyols such as polyethylene glycol, polypropylene glycol, and polytetramethylene glycol; and polyester polyols such as polyhexamethylene adipate, polyhexamethylene succinate, and polycaprolactone.

From the standpoint of obtaining printed matter having excellent durability, the polyol (a2) preferably has a weight-average molecular weight in the range of 500 to 10,000 and more preferably has a number-average molecular weight in the range of 1,000 to 3,000.

The polyol (a2) is preferably used in an amount in the range of 5% to 80% by mass relative to the total mass of materials used in the production of the polyurethane (C). Furthermore, from the standpoint of forming printed matter having excellent rubfastness, the polyol (a2) is preferably used in an amount in the range of 15% to 80% by mass.

The polyol (a2) is preferably used in combination with the vinyl polymer (a1) in a particular range from the standpoint of forming printed matter having excellent rubfastness etc. For example, the vinyl polymer (a1) and the polyol (a2) are preferably used in the range of [(a1)/(a2)]=1/20 to 20/1, and more preferably in the range of 1/10 to 10/1.

As the polyol (A) used in the production of the polyurethane (C), in addition to the compounds described above, another polyol (a3) may be used as required.

For example, a hydrophilic group-containing polyol (a3-1) can be used as the other polyol (a3). In particular, in the case where a vinyl polymer having no hydrophilic group is used as the vinyl polymer (a1), the hydrophilic group-containing polyol (a3-1) is preferably used from the standpoint of imparting water dispersibility to the resulting polyurethane (C) and obtaining a binder for an ink-jet printing ink having excellent storage stability.

Polyols having a hydrophilic group can be used as the hydrophilic group-containing polyol (a3-1). For example, anionic group-containing polyols, cationic group-containing polyols, and nonionic group-containing polyols can be used. Among these, anionic group-containing polyols and cationic group-containing polyols are preferably used.

Examples of the anionic group-containing polyols that can be used include carboxyl group-containing polyols and sulfonic acid group-containing polyols.

Examples of the carboxyl group-containing polyols that can be used include 2,2'-dimethylol propionic acid, 2,2'-dimethylol butanoic acid, 2,2'-dimethylol butyric acid, and 2,2'-dimethylol valeric acid. Among these, 2,2'-dimethylol propionic acid is preferably used. Carboxyl group-containing polyester polyols obtained by reacting any of the above carboxyl group-containing polyols and a polycarboxylic acid may also be used.

Examples of the sulfonic acid group-containing polyols that can be used include polyester polyols obtained by reacting a dicarboxylic acid such as 5-sulfoisophthalic acid, sulfoterephthalic acid, 4-sulfophthalic acid, or 5-[4-sulfophenoxy]isophthalic acid, a salt thereof, and any of the above-described low-molecular-weight polyols.

The carboxyl group-containing polyol and the sulfonic acid group-containing polyol are used so that the acid value of the polyurethane (C) becomes preferably in the range of 10 to 70, more preferably in the range of 10 to 60, and particularly preferably in the range of 20 to 60. Note that the acid value used in the present invention refers to a theoretical value calculated on the basis of the amount of acid group-containing compound, such as a carboxyl group-containing polyol, used in the production of the polyurethane (C).

Regarding the anionic groups, some of or all of the anionic groups are preferably neutralized with a basic compound or the like from the standpoint of exhibiting satisfactory water dispersibility.

Examples of the basic compound that can be used for neutralizing the anionic groups include ammonia and organic amines having a boiling point of 200° C. or higher, such as triethylamine, morpholine, monoethanolamine, and diethylethanolamine; and metal hydroxides such as NaOH, KOH, and LiOH. From the standpoint of improving water dispersion stability of the resulting coating agent, the basic compound is used so that a ratio of basic compound/anionic group is preferably in the range of 0.5 to 3.0 (molar ratio) and more preferably in the range of 0.9 to 2.0 (molar ratio).

As the cationic group-containing polyols, for example, tertiary amino group-containing polyols can be used. Specific examples thereof include N-methyl-diethanolamine and polyols obtained by reacting a compound having two epoxy groups in one molecule with a secondary amine.

Regarding the cationic groups, some of or all of the cationic groups are preferably neutralized with an acidic compound such as formic acid, acetic acid, propionic acid, succinic acid, glutaric acid, tartaric acid, or adipic acid.

Regarding the tertiary amino groups serving as the cationic groups, some of or all of the tertiary amino groups are preferably quaternized. Examples of the quaternizing agent that can be used include dimethyl sulfate, diethyl sulfate, methyl chloride, and ethyl chloride. Dimethyl sulfate is preferably used.

As the nonionic group-containing polyols, for example, polyalkylene glycols having a structural unit derived from ethylene oxide can be used.

The hydrophilic group-containing polyol (a3-1) is preferably used in an amount in the range of 1% to 45% by mass relative to the total mass of materials used in the production of the polyurethane (C).

Examples of the polyisocyanate (B) that can be used in the production of the polyurethane (C) include aromatic polyisocyanates such as 4,4'-diphenylmethane diisocyanate, 2,4'-diphenylmethane diisocyanate, carbodiimide-modified diphenylmethane diisocyanate, crude diphenylmethane diisocyanate, phenylene diisocyanate, tolylene diisocyanate, and naphthalene diisocyanate; aliphatic polyisocyanates and polyisocyanates having an alicyclic structure, such as hexamethylene diisocyanate, lysine diisocyanate, cyclohexane diisocyanate, isophorone diisocyanate, dicyclohexylmethane diisocyanate, xylylene diisocyanate, and tetramethylxylylene diisocyanate. Among these, from the standpoint of preventing yellowing, aliphatic polyisocyanates are preferably used. From the standpoint of preventing the discoloration and further improving rubfastness and alkali resistance, alicyclic structure-containing polyisocyanates are preferably used.

The polyurethane (C) can be produced by, for example, reacting the polyol (A) containing the vinyl polymer (a1) having two hydroxyl groups at one end, at least one polyol (a3) selected from the group consisting of polyether polyols, polyester polyols, polyester ether polyols, and polycarbonate polyols, and, if necessary, another polyol (a3) such as a hydrophilic group-containing polyol (a3-1) with the polyisocyanate (B) without solvent or in the presence of an organic solvent. Specifically, the reaction is preferably conducted at a temperature in the range of 20° C. to 120° C. for about 30 minutes to 24 hours.

The reaction between the polyol (A) and the polyisocyanate (B) is conducted so that, for example, an equivalent ratio of the isocyanate group in the polyisocyanate (B) to the hydroxyl group in the polyol (A) is preferably in the range of 0.8 to 2.5 and more preferably in the range of 0.9 to 1.5.

Examples of the organic solvent that can be used in producing the polyurethane (C) include ketones such as acetone and methyl ethyl ketone; ethers such as tetrahydrofuran and dioxane; acetic esters such as ethyl acetate and butyl acetate; nitriles such as acetonitrile; and amides such as dimethylformamide and N-methylpyrrolidone. These organic solvents may be used alone or in combination with two or more solvents.

In the production of the polyurethane (C) used in the present invention, in order to produce a polyurethane having a relatively high molecular weight and to further improve rubfastness etc., a chain extender may be used as required.

The polyurethane obtained by using the chain extender has a urea bond in its molecule, and thus the polyurethane can be suitably used for forming a printed image having excellent rubfastness. On the other hand, in such a polyurethane, alcohol resistance tends to decrease due to the influence of the urea bond. Accordingly, in the case where a printed image having excellent alcohol resistance in addition to the rubfastness and alkali resistance is formed, it is preferable to use, as the polyurethane (C), a polyurethane obtained without using a chain extender or a polyurethane obtained by using the minimum amount of a chain extender, specifically, a polyurethane containing a urea bond in a proportion of 10% by mass or less.

As the chain extender, for example, polyamines and other active hydrogen atom-containing compounds can be used in producing the polyurethane (C).

Examples of the polyamines that can be used include diamines such as ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, and 1,4-cyclohexanediamine; N-hydroxymethylaminoethylamine, N-hydroxyethylaminoethylamine, N-hydroxypropylaminopropylamine, N-ethylaminoethylamine, and N-methylaminopropylamine; diethylenetriamine, dipropylenetriamine, and triethylenetetramine; hydrazine, N,N'-dimethylhydrazine, and 1,6-hexamethylenebishydrazine; succinic acid dihydrazide, adipic acid dihydrazide, glutaric acid dihydrazide, sebacic acid dihydrazide, and isophthalic acid dihydrazide; and β-semicarbazide propionic acid hydrazide, 3-semicarbazide-propyl-carbazate, and semicarbazide-3-semicarbazidemethyl-3,5,5-trimethyl-cyclohexane. Among these, ethylenediamine is preferably used.

Examples of the other active hydrogen atom-containing compounds include glycols such as ethylene glycol, diethylene glycol, triethylene glycol, propylene glycol, 1,3-propanediol, 1,3-butanediol, 1,4-butanediol, hexamethylene glycol, saccharose, methylene glycol, glycerol, and sorbitol; phenols such as bisphenol A, 4,4'-dihydroxydiphenyl, 4,4'-dihydroxydiphenyl ether, 4,4'-dihydroxydiphenyl sulfone, hydrogenated bisphenol A, and hydroquinone; and water. These compounds may be used alone or in combination of two or more compounds as long as storage stability of the coating agent of the present invention does not decrease.

The chain extender is used so that, for example, the equivalent ratio of amino groups in a polyamine to excessive isocyanate groups is preferably 1.9 or less (equivalent ratio) and more preferably in the range of 0.3 to 1.0 (equivalent ratio).

The polyurethane (C) produced by the above method can be made aqueous by, for example, the following methods.

[Method 1] A method including neutralizing or quaternizing some of or all of hydrophilic groups in the polyurethane (C) obtained by a reaction between the polyol (A) and the polyisocyanate (B), then charging water to disperse the resulting polyurethane (C) in water.

[Method 2] A method including neutralizing or quaternizing some of or all of hydrophilic groups in the polyurethane (C) obtained by a reaction between the polyol (A) and the polyisocyanate (B), then charging water and conducting chain extension using the chain extender, as required, thereby dispersing the resulting polyurethane (C) in water.

[Method 3] A method including producing the polyurethane (C) by charging a polyurethane obtained by a reaction between the polyol (A) and the polyisocyanate (B) and, as required, the chain extender described above in a reactor either at one time or separately to conduct a chain extension reaction, then neutralizing or quaternizing some of or all of hydrophilic groups in the resulting polyurethane (C), and then charging water to disperse the polyurethane (C) in water.

In [Method 1] to [Method 3] described above, an emulsifier may be used, as required. In dissolving in water or dispersing in water, a machine such as a homogenizer may be used, as required.

Examples of the emulsifier include nonionic emulsifiers such as polyoxyethylene nonylphenyl ether, polyoxyethylene lauryl ether, polyoxyethylene styrylphenyl ether, polyoxyethylene sorbitol tetraoleate, and polyoxyethylene-polyoxypropylene copolymers; anionic emulsifiers such as fatty acid salts, e.g., sodium oleate, alkyl sulfuric acid ester salts, alkyl benzene sulfonates, alkyl sulfosuccinates, naphthalene sulfonates, polyoxyethylene alkyl sulfates, sodium alkane sulfonates, and sodium alkyldiphenylether sulfonates; and cationic emulsifiers such as alkylamine salts, alkyl trimethyl ammonium salts, and alkyl dimethyl benzyl ammonium salts. Among these, from the standpoint of maintaining excellent storage stability of the coating agent of the present invention, basically, anionic or nonionic emulsifiers are preferably used. Furthermore, as long as mixing stability of the coating agent of the present invention can be maintained, for example, a cationic emulsifier and an amphoteric emulsifier may be used in combination.

In producing the binder of the present invention, a hydrophilic group-containing compound may be used as an auxiliary agent that assists water dispersibility of the polyurethane (C).

Examples of the hydrophilic group-containing compound that can be used include anionic group-containing compounds, cationic group-containing compounds, amphoteric group-containing compounds, and nonionic group-containing compounds. From the standpoint of maintaining excellent storage stability of the coating agent of the present invention, nonionic group-containing compounds are preferably used.

As the nonionic group-containing compound, it is possible to use a compound having at least one active hydrogen atom in its molecule and having at least one functional group selected from the group consisting of a group including a repeating unit of ethylene oxide and a group including a repeating unit of ethylene oxide and a repeating unit of another alkylene oxide.

Examples of the compound that can be used include nonionic group-containing compounds such as polyoxyethylene glycol, polyoxyethylene-polyoxypropylene copolymer glycol, polyoxyethylene-polyoxybutylene copolymer glycol, polyoxyethylene-polyoxyalkylene copolymer glycol, all of which contain at least 30% by mass or more of a repeating unit of ethylene oxide and which have at least one active hydrogen atom in the polymer and a number-average molecular weight of 300 to 20,000, and monoalkyl ethers thereof; and compounds such as polyester polyether polyols obtained by copolymerizing these compounds.

The binder for an ink-jet printing ink of the present invention may further contain a curing agent and a curing catalyst as required, as long as storage stability and an ink ejection property are not decreased.

Examples of the curing agent that can be used include compounds having a silanol group and/or a hydrolyzable silyl group, polyepoxy compounds, polyoxazoline compounds, and polyisocyanates. Examples of the curing catalyst that can be used include lithium hydroxide, sodium hydroxide, and potassium hydroxide.

An aqueous medium (D) used in the binder for an ink-jet printing ink of the present invention is a solvent in which the polyurethane (C) can be dispersed. Examples of the aqueous medium (D) include water, organic solvents miscible with water, and mixtures thereof. Examples of the organic solvents miscible with water include alcohols such as methanol, ethanol, and n-propyl alcohol, and isopropyl alcohol; ketones such as acetone and methyl ethyl ketone; polyalkylene glycols such as ethylene glycol, diethylene glycol, and propylene glycol; alkyl ethers of polyalkylene glycols; and lactams such as N-methyl-2-pyrrolidone. In the present invention, only water may be used. Alternatively, a mixture of water and an organic solvent miscible with water may be used. Alternatively, only an organic solvent miscible with water may be used. From the standpoint of safety and the burden on the environment, the use of only water or the use of water and an organic solvent miscible with water is preferable, and the use of only water is particularly preferable.

A polyurethane composition containing the polyurethane (C) and the aqueous medium (D) and obtained by the method described above can significantly improve rubfastness and alkali resistance of printed matter, and thus can be suitably used in a dedicated manner as a binder resin of an ink-jet printing ink.

From the standpoint of achieving storage stability of an ink and durability such as excellent rubfastness and alkali resistance, the binder for an ink-jet printing ink contains the polyurethane (C) in an amount of preferably 10% to 50% by mass and more preferably 15% to 35% by mass relative to the total amount of the binder for an ink-jet printing ink. The binder for an ink-jet printing ink contains the aqueous medium (D) in an amount of preferably 50% to 90% by mass and more preferably 65% to 85% by mass relative to the total amount of the binder for an ink-jet printing ink.

Next, an ink-jet printing ink of the present invention will be described.

The ink-jet printing ink of the present invention contains the above-described binder for an ink-jet printing ink, a pigment or a dye, and, as required, various additives.

Known and commonly used inorganic pigments and organic pigments can be used as the pigment.

Examples of the inorganic pigments that can be used include titanium oxide, antimony red, colcothar, cadmium red, cadmium yellow, cobalt blue, prussian blue, ultramarine blue, carbon black, and graphite.

Examples of the organic pigments that can be used include quinacridone pigments, quinacridonequinone pigments, dioxazine pigments, phthalocyanine pigments, anthrapyrimidine pigments, anthanthrone pigments, indanthrone pigments, flavanthrone pigments, perylene pigments, diketopyrrolopyrrole pigments, perinone pigments, quinophthalone pigments, anthraquinone pigments, thioindigo pigments, benzimidazolone pigments, and azo pigments.

These pigments may be used in combination of two or more pigments. These pigments may be surface-treated so as to have a self-dispersion capability in an aqueous medium.

Examples of the dyes that can be used include azo dyes such as monoazo and disazo dyes, metal complex dyes, naphthol dyes, anthraquinone dyes, indigo dyes, carbonium dyes, quinoimine dyes, cyanine dyes, quinoline dyes, nitro dyes, nitroso dyes, benzoquinone dyes, naphthoquinone dyes, naphthalimide dyes, perinone dyes, phthalocyanine dyes, and triarylmethane dyes.

Examples of the additives that can be used include a polymer dispersant, a viscosity-adjusting agent, a humectant, a defoaming agent, a surfactant, an antiseptic agent, a pH adjusting agent, a chelating agent, a plasticizer, an ultraviolet absorbing agent, and an antioxidant. Besides, acrylic resins and the like that have been used as a binder for existing ink-jet printing inks can be used.

Examples of the polymer dispersant that can be used include acrylic resins and styrene-acrylic resins. These resins may be any of random-type, block-type, and graft-type polymers. In the case where the polymer dispersant is used, an acid or a base may be used in combination in order to neutralize the polymer dispersant.

The ink-jet printing ink can be prepared by, for example, any of the following production methods.

(1) A method for preparing an ink, including mixing the pigment or the dye, the aqueous medium, the binder for an ink-jet printing ink, and, as required, the additives at one time using a dispersing device.

(2) A method for preparing an ink, including mixing the pigment or the dye, the aqueous medium, and, as required, the additives using a dispersing device to prepare an ink precursor composed of an aqueous dispersion of the pigment or the dye, and then mixing the ink precursor composed of the aqueous dispersion of the pigment or the dye with the binder for an ink-jet printing ink, and as required, an aqueous medium and additives using a dispersing device.

The ink precursor containing a pigment, the ink precursor being used in the method for producing an ink described in (2) above, can be prepared by, for example, any of the methods described below.

(i) A method for preparing an ink precursor composed of an aqueous dispersion containing a pigment, the method including preliminarily kneading a pigment and an additive such as a polymer dispersant using a two-roll mill, a mixer, or the like to prepare a kneaded product, and mixing the kneaded product with an aqueous medium using a dispersing device.

(ii) A method for preparing an ink precursor composed of an aqueous dispersion containing a pigment, the method including mixing a pigment with a polymer dispersant using a dispersing device, then depositing the polymer dispersant on the surface of the pigment by controlling the solubility of the polymer dispersant, and further mixing the resulting mixture using a dispersing device.

(iii) A method for preparing an ink precursor composed of an aqueous dispersion containing a pigment, the method including mixing a pigment with the additive using a dispersing device, and then mixing the resulting mixture with a resin emulsion using a dispersing device.

Examples of the dispersing device that can be used in the production of the ink-jet printing ink include an ultrasonic homogenizer, a high-pressure homogenizer, a paint shaker, a ball mill, a roll mill, a sand mill, a sand grinder, a Dyno-Mill, a Dispermat, an SC mill, and a Nanomizer. These dispersing devices may be used alone or in combination of two or more devices.

Coarse particles having a particle diameter of about 250 nm or more may be present in the ink-jet printing ink obtained by the above methods. The coarse particles may cause clogging of a printer nozzle or the like, resulting in the degradation of an ink ejection property. Therefore, after the preparation of the aqueous dispersion containing a pigment or after the preparation of the ink, it is preferable to remove the coarse particles by a method such as centrifugal separation or filtering.

As the ink-jet printing ink obtained above, an ink containing particles having a volume-average particle diameter of 200 nm or less is preferably used. In particular, in the case where an image having higher glossiness such as photographic image quality is formed, the volume-average particle diameter is more preferably in the range of 80 to 120 nm.

The ink-jet printing ink preferably contains 0.2% to 10% by mass of the polyurethane (C), 50% to 95% by mass of the aqueous medium, and 0.5% to 15% by mass of a pigment or a dye relative to the total of the ink-jet printing ink.

The ink-jet printing ink of the present invention obtained by any of the above methods can be used in ink-jet printing in a dedicated manner using an ink-jet printer, and can be used in ink-jet printing on a base such as paper, a plastic film, or a metal film or sheet. The method of ink jet is not particularly limited, but known methods such as continuous jet methods (e.g., a charge-controlling method and a spray method) and on-demand methods (e.g., a piezoelectric method, a thermal method, and an electrostatic attraction method) can be employed.

Printed matter printed by using the ink-jet printing ink of the present invention has excellent rubfastness, and thus degradation of a printed image due to lack of a pigment or the like does not tend to occur. The printed matter also has excellent alkali resistance, and thus it is possible to prevent the generation of blurring or the like due to the adhesion of an alkaline cleaning agent or the like on the surface of a printed image. Furthermore, the printed matter has an image having a high coloring density, and thus, for example, the printed matter can be used in various applications such as printed matter obtained by photographic printing by ink-jet printing or high-speed printing by ink-jet printing.

EXAMPLES

The present invention will now be described more specifically by way of Examples and Comparative Examples.

Preparation Example 1

Preparation of Vinyl Polymer (a1-1) Having Two Hydroxyl Groups at One End

To a four-necked flask equipped with a thermometer, a stirring device, a reflux condenser, and a nitrogen inlet tube, 700 parts by mass of methyl ethyl ketone was charged. Subsequently, 291 parts by mass of methyl (meth)acrylate, 8.7 parts by mass of 3-mercapto-1,2-propanediol, and 0.15 parts by mass of 2,2'-azobis(2-methylpropionitrile) were supplied to the above reaction vessel. The resulting mixture was allowed to react, thus preparing a solvent solution of a vinyl polymer (a1-1) having two hydroxyl groups at one end and having a number-average molecular weight of 3,000.

Preparation Example 2

Preparation of Vinyl Polymer (a1-2) Having Two Hydroxyl Groups at One End

To a four-necked flask equipped with a thermometer, a stirring device, a reflux condenser, and a nitrogen inlet tube, 700 parts by mass of methyl ethyl ketone was charged. Subsequently, 297 parts by mass of methyl (meth)acrylate, 3 parts by mass of 3-mercapto-1,2-propanediol, and 0.15 parts by mass of 2,2'-azobis(2-methylpropionitrile) were supplied to the above reaction vessel. The resulting mixture was allowed to react, thus preparing a solvent solution of a vinyl polymer (a1-2) having two hydroxyl groups at one end and having a number-average molecular weight of 12,000.

Comparative Preparation Example 3

Preparation of Vinyl Polymer (a1-3) Having Two Hydroxyl Groups in Molecular Chain To a four-necked flask equipped with a thermometer, a stirring device, a reflux condenser, and a nitrogen inlet tube, 700 parts by mass of methyl ethyl ketone was charged. Subsequently, 261 parts by mass of methyl (meth)acrylate, 22 parts by mass of methacrylic acid 2-hydroxyethyl ester (2-hydroxyethyl methacrylate), 17 parts by mass of 1-dodecanethiol, and 0.15 parts by mass of 2,2'-azobis(2-methylpropionitrile) were supplied to the above reaction vessel. The resulting mixture was allowed to react, thus preparing a solvent solution of a vinyl polymer (a1-3) having two hydroxyl groups in a molecular chain and having a number-average molecular weight of 3,000.

Example 1

In a vessel purged with nitrogen and equipped with a thermometer, a nitrogen gas inlet tube, and a stirrer, 286 parts by mass of the solvent solution of the vinyl polymer (a1-1) obtained in Preparation Example 1, 93 parts by mass of polyoxytetramethylene glycol (number-average molecular weight: 2,000), 35 parts by mass of 2,2-dimethylol propionic acid, and 72 parts by mass of isophorone diisocyanate were allowed to react at 80° C. for 10 hours in the presence of 84 parts by mass of methyl ethyl ketone used as an organic solvent. Thus, an organic solvent solution of a polyurethane (acid value: 50) having a weight-average molecular weight of 45,000 was obtained.

Next, 30 parts by mass of a 48 mass % aqueous potassium hydroxide solution was added to the organic solvent solution of the polyurethane, thereby neutralizing some of or all of carboxyl groups in the polyurethane. Furthermore, 685 parts by mass of water was added thereto, and the resulting mixture was sufficiently stirred to obtain an aqueous dispersion of the polyurethane.

Next, the solvent of the aqueous dispersion of the polyurethane was removed. Furthermore, water was added to the aqueous dispersion to adjust the nonvolatile content to 25% by mass. Thus, a binder for an ink-jet printing ink of the present invention was obtained.

Example 2

In a vessel purged with nitrogen and equipped with a thermometer, a nitrogen gas inlet tube, and a stirrer, 286 parts by mass of the solvent solution of the vinyl polymer (a1-2) obtained in Preparation Example 2, 96 parts by mass of polyoxytetramethylene glycol (number-average molecular weight: 2,000), 35 parts by mass of 2,2-dimethylol propionic acid, and 70 parts by mass of isophorone diisocyanate were allowed to react at 80° C. for 10 hours in the presence of 84 parts by mass of methyl ethyl ketone used as an organic solvent. Thus, an organic solvent solution of a polyurethane (acid value: 50) having a weight-average molecular weight of 46,000 was obtained.

Next, 30 parts by mass of a 48 mass % aqueous potassium hydroxide solution was added to the organic solvent solution of the polyurethane, thereby neutralizing some of or all of carboxyl groups in the polyurethane. Furthermore, 685 parts by mass of water was added thereto, and the resulting mixture was sufficiently stirred to obtain an aqueous dispersion of the polyurethane.

Next, the solvent of the aqueous dispersion of the polyurethane was removed. Furthermore, water was added to the aqueous dispersion to adjust the nonvolatile content to 25% by mass. Thus, a binder for an ink-jet printing ink of the present invention was obtained.

Example 3

In a vessel purged with nitrogen and equipped with a thermometer, a nitrogen gas inlet tube, and a stirrer, 10 parts by mass of the solvent solution of the vinyl polymer (a1-1) obtained in Preparation Example 1, 172 parts by mass of polyoxytetramethylene glycol (number-average molecular weight: 2,000), 35 parts by mass of 2,2-dimethylol propionic acid, and 76 parts by mass of isophorone diisocyanate were allowed to react at 80° C. for 10 hours in the presence of 277 parts by mass of methyl ethyl ketone used as an organic solvent. Thus, an organic solvent solution of a polyurethane (acid value: 50) having a weight-average molecular weight of 46,000 was obtained.

Next, 30 parts by mass of a 48 mass % aqueous potassium hydroxide solution was added to the organic solvent solution of the polyurethane, thereby neutralizing some of or all of carboxyl groups in the polyurethane. Furthermore, 685 parts by mass of water was added thereto, and the resulting mixture was sufficiently stirred to obtain an aqueous dispersion of the polyurethane.

Next, the solvent of the aqueous dispersion of the polyurethane was removed. Furthermore, water was added to the aqueous dispersion to adjust the nonvolatile content to 25% by mass. Thus, a binder for an ink-jet printing ink of the present invention was obtained.

Example 4

In a vessel purged with nitrogen and equipped with a thermometer, a nitrogen gas inlet tube, and a stirrer, 571 parts by mass of the solvent solution of the vinyl polymer (a1-1) obtained in Preparation Example 1, 11 parts by mass of polyoxytetramethylene glycol (number-average molecular weight: 2,000), 35 parts by mass of 2,2-dimethylol propionic acid, and 68 parts by mass of isophorone diisocyanate were allowed to react at 80° C. for 10 hours. Thus, an organic solvent solution of a polyurethane (acid value: 50) having a weight-average molecular weight of 44,000 was obtained.

Next, 30 parts by mass of a 48 mass % aqueous potassium hydroxide solution was added to the organic solvent solution of the polyurethane, thereby neutralizing some of or all of carboxyl groups in the polyurethane. Furthermore, 685 parts by mass of water was added thereto, and the resulting mixture was sufficiently stirred to obtain an aqueous dispersion of the polyurethane.

Next, the solvent of the aqueous dispersion of the polyurethane was removed. Furthermore, water was added to the aqueous dispersion to adjust the nonvolatile content to 25% by mass. Thus, a binder for an ink-jet printing ink of the present invention was obtained.

Example 5

In a vessel purged with nitrogen and equipped with a thermometer, a nitrogen gas inlet tube, and a stirrer, 286 parts by mass of the solvent solution of the vinyl polymer (a1-1) obtained in Preparation Example 1, 93 parts by mass of a polycarbonate polyol (number-average molecular weight: 2,000) obtained by a reaction between 1,6-hexanediol and methyl carbonate, 35 parts by mass of 2,2-dimethylol propionic acid, and 72 parts by mass of isophorone diisocyanate were allowed to react at 80° C. for 10 hours in the presence of 84 parts by mass of methyl ethyl ketone used as an organic solvent. Thus, an organic solvent solution of a polyurethane (acid value: 50) having a weight-average molecular weight of 45,000 was obtained.

Next, 30 parts by mass of a 48 mass % aqueous potassium hydroxide solution was added to the organic solvent solution of the polyurethane, thereby neutralizing some of or all of carboxyl groups in the polyurethane. Furthermore, 685 parts by mass of water was added thereto, and the resulting mixture was sufficiently stirred to obtain an aqueous dispersion of the polyurethane.

Example 6

In a vessel purged with nitrogen and equipped with a thermometer, a nitrogen gas inlet tube, and a stirrer, 296 parts by mass of the solvent solution of the vinyl polymer (a1-1) obtained in Preparation Example 1, 156 parts by mass of polyoxytetramethylene glycol (number-average molecular weight: 2,000), 11 parts by mass of 2,2-dimethylol propionic acid, and 41 parts by mass of isophorone diisocyanate were allowed to react at 80° C. for 10 hours in the presence of 87 parts by mass of methyl ethyl ketone used as an organic solvent. Thus, an organic solvent solution of a polyurethane (acid value: 15) having a weight-average molecular weight of 45,000 was obtained.

Next, 9 parts by mass of a 48 mass % aqueous potassium hydroxide solution was added to the organic solvent solution of the polyurethane, thereby neutralizing some of or all of carboxyl groups in the polyurethane. Furthermore, 695 parts by mass of water was added thereto, and the resulting mixture was sufficiently stirred to obtain an aqueous dispersion of the polyurethane.

Next, the solvent of the aqueous dispersion of the polyurethane was removed. Furthermore, water was added to the aqueous dispersion to adjust the nonvolatile content to 25% by mass. Thus, a binder for an ink-jet printing ink of the present invention was obtained.

Example 7

In a vessel purged with nitrogen and equipped with a thermometer, a nitrogen gas inlet tube, and a stirrer, 286 parts by mass of the solvent solution of the vinyl polymer (a1-1) obtained in Preparation Example 1, 93 parts by mass of polyoxytetramethylene glycol (number-average molecular weight: 2,000), 35 parts by mass of 2,2-dimethylol propionic acid, and 72 parts by mass of isophorone diisocyanate were allowed to react at 80° C. for 10 hours in the presence of 84 parts by mass of methyl ethyl ketone used as an organic solvent. Thus, an organic solvent solution of a polyurethane (acid value: 50) having a weight-average molecular weight of 100,000 was obtained.

Next, 30 parts by mass of a 48 mass % aqueous potassium hydroxide solution was added to the organic solvent solution of the polyurethane, thereby neutralizing some of or all of carboxyl groups in the polyurethane. Furthermore, 685 parts by mass of water was added thereto, and the resulting mixture was sufficiently stirred to obtain an aqueous dispersion of the polyurethane.

Next, the solvent of the aqueous dispersion of the polyurethane was removed. Furthermore, water was added to the aqueous dispersion to adjust the nonvolatile content to 25% by mass. Thus, a binder for an ink-jet printing ink of the present invention was obtained.

Comparative Example 1

In a vessel purged with nitrogen and equipped with a thermometer, a nitrogen gas inlet tube, and a stirrer, 174 parts by mass of polyoxytetramethylene glycol (number-average molecular weight: 2,000), 35 parts by mass of 2,2-dimethylol propionic acid, and 76 parts by mass of isophorone diisocyanate were allowed to react at 80° C. for 10 hours in the presence of 284 parts by mass of methyl ethyl ketone used as an organic solvent. Thus, an organic solvent solution of a polyurethane (acid value: 50) having a weight-average molecular weight of 46,000 was obtained.

Next, 30 parts by mass of a 48 mass % aqueous potassium hydroxide solution was added to the organic solvent solution of the polyurethane, thereby neutralizing some of or all of carboxyl groups in the polyurethane. Furthermore, 685 parts by mass of water was added thereto, and the resulting mixture was sufficiently stirred to obtain an aqueous dispersion of the polyurethane.

Next, the solvent of the aqueous dispersion of the polyurethane was removed. Furthermore, water was added to the aqueous dispersion to adjust the nonvolatile content to 25% by mass. Thus, a binder for an ink-jet printing ink was obtained.

Comparative Example 2

In a vessel purged with nitrogen and equipped with a thermometer, a nitrogen gas inlet tube, and a stirrer, 611 parts by mass of the solvent solution of the vinyl polymer (a1-1) obtained in Preparation Example 1, 35 parts by mass of 2,2-dimethylol propionic acid, and 68 parts by mass of isophorone diisocyanate were allowed to react at 80° C. for 10 hours. Thus, an organic solvent solution of a polyurethane (acid value: 50) having a weight-average molecular weight of 44,000 was obtained.

Next, 30 parts by mass of a 48 mass % aqueous potassium hydroxide solution was added to the organic solvent solution of the polyurethane, thereby neutralizing some of or all of carboxyl groups in the polyurethane. Furthermore, 685 parts by mass of water was added thereto, and the resulting mixture was sufficiently stirred to obtain an aqueous dispersion of the polyurethane.

Next, the solvent of the aqueous dispersion of the polyurethane was removed. Furthermore, water was added to the aqueous dispersion to adjust the nonvolatile content to 25% by mass. Thus, a binder for an ink-jet printing ink was obtained.

Comparative Example 3

A binder for an ink-jet printing ink, the binder having a nonvolatile content of 25% by mass, was obtained as in Example 1 except that 286 parts by mass of the solvent solution of the vinyl polymer (a1-3) obtained in Comparative Preparation Example 3 was used instead of the solvent solution of the vinyl polymer (a1-1).

[Measurement of Weight-Average Molecular Weight]

The weight-average molecular weight of the polyurethane (C) was measured by gel permeation chromatography (GPC). Specifically, the polyurethane (C) was applied onto a glass plate with a 3-mil applicator, and dried at room temperature for one hour to prepare a semi-dry coating film. The prepared coating film was separated from the glass plate, and 0.4 g of the coating film was dissolved in 100 g of tetrahydrofuran. This solution was used as a measurement sample.

A high-performance liquid chromatograph HLC-8220 manufactured by Tosoh Corporation was used as a measuring apparatus. Columns TSK-GEL (HXL-H, G5000HXL, G4000HXL, G3000HXL, and G2000HXL) manufactured by Tosoh Corporation were used as columns in combination.

A calibration curve was prepared by using, as standard samples, standard polystyrenes (molecular weight: 4,480,000, 4,250,000, 2,880,000, 2,750,000, 1,850,000, 860,000, 450,000, 411,000, 355,000, 190,000, 160,000, 96,000, 50,000, 37,900, 19,800, 19,600, 5,570, 4,000, 2,980, 2,030, and 500) manufactured by Showa Denko K.K. and Tosoh Corporation.

The weight-average molecular weight was measured with a refractive index (RI) detector using tetrahydrofuran as an eluate and a liquid for dissolving a sample, at a flow rate of 1 mL/min, with an amount of sample injection of 500 µL, and at a sample concentration of 0.4%.

Preparation Example 4

Aqueous Dispersion of Quinacridone Pigment

In a planetary mixer PLM-V-50V (manufactured by Inoue MFG., Inc.) having a volume of 50 L, 1,500 g of a vinyl polymer (styrene/acrylic acid/methacrylic acid=77/10/13 (mass ratio), weight-average molecular weight: 11,000, acid value: 156 mg KOH/g), 4,630 g of a quinacridone pigment (Cromophtal Jet Magenta DMQ manufactured by Ciba Specialty Chemicals), 380 g of phthalimide methylated 3,10-dichloroquinacridone (the average number of phthalimide methyl groups per molecule: 1.4), 2,600 g of diethylene glycol, and 688 g of a 34 mass % aqueous potassium hydroxide solution were charged, and kneading was continued for four hours.

A total of 8,000 g of ion exchange water warmed at 60° C. was added to the resulting kneaded product over a period of two hours. Thus, a colored resin composition having a nonvolatile content of 37.9% by mass was obtained.

Next, stirring was conducted with a dispersion stirring device while adding 744 g of diethylene glycol and 7,380 g of ion exchange water little by little to 12 kg of the colored resin composition obtained by the above method. Thus, a precursor of an aqueous dispersion (aqueous dispersion before a dispersion treatment) of the quinacridone pigment was obtained.

Subsequently, 18 kg of the precursor of the aqueous dispersion was treated with a bead mill (Nano-mill NM-G2L, manufactured by Asada Iron Works Co., Ltd., beads; zirconia beads having a diameter $\phi$ of 0.3 mm, amount of beads filled; 85%, cooling water temperature; 10° C., the number of revolutions; 2,660 revolutions/min). The liquid passed through the bead mill was centrifuged at 13,000 G for 10 minutes, and was then filtered with a filter having an effective pore diameter of 0.5 µm. Thus, an aqueous dispersion of the quinacridone pigment was obtained. The concentration of the quinacridone pigment in this aqueous dispersion was 14.9% by mass.

[Preparation of Ink-Jet Printing Ink]

Each of the binders for ink-jet printing inks, the binders having been obtained in Examples 1 to 7 and Comparative Examples 1 to 3, the aqueous pigment dispersion of the quinacridone pigment obtained in Preparation Example 4, 2-pyrrolidinone, triethylene glycol monobutyl ether, glycerol, a surfactant (Surfynol 440, manufactured by Air Products), and ion exchange water were mixed and stirred in accordance with the mixing ratio described below so that the concentration of the quinacridone pigment was 4% by mass and the concentration of the polyurethane was 1% by mass. Thus, ink-jet printing inks were prepared.

(Mixing Ratio of Ink-Jet Printing Ink)

Aqueous dispersion of quinacridone pigment obtained in Preparation Example 4 (pigment concentration: 14.9%); 26.8 g 2-Pyrrolidinone; 8.0 g Triethylene glycol monobutyl ether; 8.0 g Glycerol; 3.0 g Surfactant (Surfynol 440, manufactured by Air Products); 0.5 g Ion exchange water; 48.7 g Binder for ink-jet printing ink obtained in each of Examples 1 to 7 and Comparative Examples 1 to 3 (nonvolatile content: 25% by mass); 4.0 g

[Evaluation of Storage Stability of Ink-Jet Printing Ink]

The storage stability was evaluated on the basis of a viscosity of each of the ink-jet printing inks obtained above and the particle diameter of particles dispersed in the ink. The viscosity was measured with a VISCOMETER TV-22 manufactured by Toki Sangyo Co., Ltd. The particle diameter was measured with a Microtrac UPA EX150 manufactured by Nikkiso Co., Ltd.

Next, the ink was sealed in a glass container such as a screw vial and subjected to a heating test in a thermostatic chamber at 70° C. for four weeks. After this heating test, the viscosity of the ink and the particle diameter of particles dispersed in the ink were measured by the same methods as those described above.

Changes in the viscosity of the ink and the particle diameter after the heating test relative to the viscosity and the particle diameter before the heating test were calculated on the basis of the formulae below to evaluate the storage stability of the pigment ink.

[{(particle diameter of particles dispersed in ink after heating test)−(particle diameter of particles dispersed in ink before heating test)}/(particle diameter of particles dispersed in ink before heating test)]×100 (Formula I)

[Criteria]

b: The ratio of change in the particle diameter was less than 5%.

c: The ratio of change in the particle diameter was 5% or more and less than 10%.

d: The ratio of change in the particle diameter was 10% or more.

[{(viscosity of ink after heating test)−(viscosity of ink before heating test)}/(viscosity of ink before heating test)]×100 (Formula II)

[Criteria]

b: The ratio of change in the viscosity was less than 2%.

c: The ratio of change in the viscosity was 2% or more and less than 5%.

d: The ratio of change in the viscosity was 5% or more.

[Evaluation of Ink Ejection Stability]

A diagnostic page was printed with a Photosmart D5360 (manufactured by Hewlett-Packard Company) including a black ink cartridge filled with the above ink-jet pigment ink, and the state of a nozzle was examined. Solid printing in an area of 18 cm×25 cm per page was successively performed on 20 pages with a print density setting of 100%. Subsequently, the diagnostic page was again printed, and the state of the nozzle was examined. A change in the state of the nozzle before and after the successive solid printing operations was evaluated as an ink ejection property. The evaluation criteria are described below.

[Criteria]

a: The state of the nozzle did not change, and no ejection abnormality occurred.

b: Although the ink somewhat adhered to the nozzle, deviation of the ejection direction of the ink did not occur.

c: After the solid printing was successively performed on 20 pages, deviation of the ejection direction of the ink and non-ejection of the ink occurred.

d: In the course of printing, deviation of the ejection direction of the ink and non-ejection of the ink occurred, and the successive printing of 20 pages could not be completed.

[Evaluation of Printing Performance of Pigment Ink for Ink-Jet Printing]

(Glossiness)

Solid printing with a print density setting of 100% was conducted on a printing surface of photo paper (glossy) [HP Advanced Photo Paper manufactured by Hewlett-Packard Company], which is paper dedicated for ink-jet printing, using a commercially available thermal jet-type ink-jet printer (Photosmart D5360; manufactured by Hewlett-Packard Company) including a black ink cartridge filled with the above pigment ink.

The printed matter obtained above was left to stand at room temperature for 24 hours. A glossiness at 20 degrees was then measured at arbitrary three points of the printed matter using a Micro-haze plus (available from Toyo Seiki Seisaku-sho, Ltd.). The average of the glossiness was calculated.

(Rubfastness)

Solid printing with a print density setting of 100% was conducted on a printing surface of photo printing paper (glossy) [HP Advanced Photo Paper manufactured by Hewlett-Packard Company] using a commercially available thermal jet-type ink-jet printer (Photosmart D5360; manufactured by Hewlett-Packard Company) including a black ink cartridge filled with the above pigment ink. Thus, printed matter for evaluation was obtained.

The printed matter for evaluation was dried at room temperature for 10 minutes, and the printed surface was then scratched with a nail at a load of about 5 kg. The degree of scratching of the color etc. of the printed surface was evaluated by visual observation in accordance with the criteria described below. For inks with which the printed matter for evaluation could not be obtained due to insufficient ejection stability of the inks, a comment "Printing could not be performed" is given in the table below.

[Criteria]

A: No scratches were observed on the printed surface, and detachment of a colorant and other defects were also not observed.

B: Although some scratches were formed on the printed surface, the scratches were of a level that would not cause a practical problem and detachment of a colorant and other defects were not observed.

C: Some scratches were formed on the printed surface, and detachment of a colorant and other defects were also observed.

D: Significant scratches were formed in an area of about 50% or more of the printed surface and detachment of a colorant and other defects were also observed.

(Alkali Resistance)

The printed matter for evaluation was dried at room temperature for 10 minutes. Three drops of a 0.5 mass % aqueous KOH solution were then dropped on the printed surface with a pipette. Ten seconds later, the printed surface was rubbed with a finger, and the surface state of the printed surface was evaluated with visual observation. The evaluation criteria are described below. For inks with which the printed matter for evaluation could not be obtained due to insufficient ejection stability of the inks, a comment "Printing could not be performed" is given in the table below.

[Criteria]

A: No detachment of a colorant etc. was observed on the printed surface, and discoloration of the printed surface was also not observed.

B: Although detachment of a colorant etc. was not observed on the printed surface, discoloration of the printed surface slightly occurred.

C: Detachment of a colorant etc. somewhat occurred on the printed surface, and discoloration of the printed surface also occurred.

D: Significant detachment of a colorant etc. occurred in an area of about 50% or more of the printed surface, and discoloration of the printed surface also occurred.

TABLE 1

|  | Example 1 | Example 2 | Example 3 | Example 4 | Example 5 |
|---|---|---|---|---|---|
| Vinyl polymer (a1) | a1-1 | a1-2 | a1-1 | a1-1 | a1-1 |
| Polyol (a2) | PTMG | PTMG | PTMG | PTMG | PC |
| Another polyol (a3) | DMPA | DMPA | DMPA | DMPA | DMPA |
| Polyisocyanate (B) | IPDI | IPDI | IPDI | IPDI | IPDI |
| Change in particle diameter | b | b | b | b | b |
| Change in viscosity | b | b | b | b | b |
| Ink ejection property | a | b | b | b | b |
| Glossiness | 65 | 60 | 62 | 62 | 62 |
| Rubfastness | A | A | A | B | A |
| Alkali resistance | A | A | B | A | A |

TABLE 2

|  | Example 6 | Example 7 | Comparative Example 1 | Comparative Example 2 | Comparative Example 3 |
|---|---|---|---|---|---|
| Vinyl polymer (a1) | a1-1 | a1-1 | — | a1-1 | a1-3 |
| Polyol (a2) | PTMG | PTMG | PTMG | — | PTMG |
| Another polyol (a3) | DMPA | DMPA | DMPA | DMPA | DMPA |
| Polyisocyanate (B) | IPDI | IPDI | IPDI | IPDI | IPDI |
| Change in particle diameter | b | b | b | b | c |
| Change in viscosity | b | b | b | b | c |
| Ink ejection property | c | c | b | b | d |
| Glossiness | 61 | 60 | 63 | 61 | 58 |
| Rubfastness | A | A | B | D | C |
| Alkali resistance | A | A | C | B | C |

Abbreviations in Tables 1 and 2 will be described below.

"PTMG"; Polyoxytetramethylene glycol (number-average molecular weight: 2,000)

"DMPA"; 2,2-Dimethylol propionic acid

"IPDI"; Isophorone diisocyanate "PC"; Polycarbonate polyol (number-average molecular weight: 2,000) obtained by a reaction between 1,6-hexanediol and methyl carbonate

The invention claimed is:

1. A binder for an ink jet printing ink, the binder comprising:
    an aqueous medium (D); and
    a polyurethane (C) obtained by reacting a polyol (A) containing a vinyl polymer (a1) having two hydroxyl groups at one end and at least one polyol (a2) selected from the group consisting of polyether polyols, polyester polyols, polyester ether polyols, and polycarbonate polyols with a polyisocyanate (B), wherein:
    the polyurethane (C) has a structure derived from the vinyl polymer (a1) in a side chain thereof,
    the polyurethane (C) is dispersed in the aqueous medium (D),
    the vinyl polymer (a1) is used in an amount in the range of 1% to 60% by mass relative to the total mass of the ingredients used in the production of the polyurethane (C),
    the polyol (a2) is used in a range of 5% to 80% by mass relative to the total mass of the ingredients used in producing the polyurethane (C), and
    the mass ratio of the vinyl polymer (a1) to the polyol (a2) is from 1/20 to 20/1.

2. The binder for an ink jet printing ink according to claim 1, wherein the vinyl polymer (a1) having two hydroxyl groups at one end has a number-average molecular weight of 500 to 10,000.

3. The binder for an ink jet printing ink according to claim 1, wherein the vinyl polymer (a1) having two hydroxyl groups at one end is obtained by reacting a vinyl monomer (F) with a chain transfer agent (E) having two hydroxyl groups and one mercapto group.

4. The binder for an ink jet printing ink according to claim 3, wherein the vinyl monomer (F) contains at least one vinyl monomer selected from the group consisting of (meth)acrylic acids and (meth)acrylic acid alkyl esters.

5. The binder for an ink jet printing ink according to claim 1, wherein the polyol (a2) has a number-average molecular weight of 500 to 10,000.

6. The binder for an ink-jet printing ink according to claim 1, wherein the polyol (a2) is a polyoxyalkylene glycol.

7. The binder for an ink jet printing ink according to claim 1, wherein the polyurethane (C) has at least one of an anionic group and a cationic group.

8. The binder for an ink jet printing ink according to claim 1, wherein the polyurethane (C) has a carboxyl group or a carboxylate group as an anionic group, and the anionic group is derived from at least one selected from the group consisting of 2,2-dimethylol propionic acid and 2,2'-dimethylol butanoic acid.

9. The binder for an ink jet printing ink according to claim 1, wherein the polyurethane (C) has an acid value of 20 to 60.

10. The binder for an ink-jet printing ink according to claim 1, wherein the polyurethane (C) has a weight-average molecular weight in the range of 10,000 to 150,000.

11. An ink jet printing ink comprising the binder for an ink jet printing ink according to any one of claims 1 to 8, 9 and 10; and a pigment or a dye.

12. Printed matter printed with the ink-jet printing ink according to claim 11.

* * * * *